United States Patent
Gomez et al.

(10) Patent No.: US 9,881,505 B2
(45) Date of Patent: Jan. 30, 2018

(54) METHOD AND ELECTRONIC DEVICE OF CONTROL OF MESSAGES EXCHANGED BETWEEN AN AIRCRAFT AND A GROUND STATION, ASSOCIATED COMPUTER PROGRAM PRODUCT

(71) Applicant: THALES, Courbevoie (FR)

(72) Inventors: Stéphane Gomez, Toulouse (FR); Cécile Gadat, Toulouse (FR); Nicolas Rossi, Toulouse (FR)

(73) Assignee: THALES, Courbevoie (FR)

( * ) Notice: Subject to any disclaimer, the term of this patent is extended or adjusted under 35 U.S.C. 154(b) by 34 days.

(21) Appl. No.: 15/085,857

(22) Filed: Mar. 30, 2016

(65) Prior Publication Data

US 2016/0293013 A1 Oct. 6, 2016

(30) Foreign Application Priority Data

Mar. 31, 2015 (FR) ...................... 15 00648

(51) Int. Cl.
*G08G 5/00* (2006.01)
*H04W 4/14* (2009.01)
(Continued)

(52) U.S. Cl.
CPC ........... *G08G 5/0013* (2013.01); *B64D 43/00* (2013.01); *G08G 5/0021* (2013.01);
(Continued)

(58) Field of Classification Search
CPC .... B64D 43/00; G08G 5/0013; G08G 5/0021; H04B 7/18506; H04L 45/66; H04W 4/14
See application file for complete search history.

(56) References Cited

U.S. PATENT DOCUMENTS 6,160,497 A 12/2000 Clark
2003/0006910 A1 1/2003 Dame
(Continued)

FOREIGN PATENT DOCUMENTS

EP 2674926 A1 12/2013

OTHER PUBLICATIONS

Search Report dated Feb. 18, 2016 for French Patent Application No. 1500648 filed on Mar. 31, 2015.

*Primary Examiner* — Sisay Yacob
(74) *Attorney, Agent, or Firm* — Knobbe Martens Olson & Bear, LLP (57) ABSTRACT

A method and electronic device for control of messages exchanged between an aircraft and a ground station, and associated computer program product are disclosed. In one aspect, the method includes acquiring a message, extracting descriptive data from the acquired message, and determining the identifier of the acquired message. If the identifier of the acquired message corresponds to a shared identifier of the messages of a dialog in progress, the method includes associating that acquired message with that dialog. If not, the method includes associating the acquired message with a new dialog. The method further includes determining the position of a symbol corresponding to the dialog associated with the acquired message, the position being determined based on the type and start date of this dialog, the symbol being configured to be displayed in a display zone of the symbols corresponding to the different dialogs.

15 Claims, 3 Drawing Sheets

(51) Int. Cl.
*H04L 12/721* (2013.01)
*B64D 43/00* (2006.01)
*H04B 7/185* (2006.01)

(52) U.S. Cl.
CPC ......... *H04B 7/18506* (2013.01); *H04L 45/66* (2013.01); *H04W 4/14* (2013.01)

(56) References Cited

U.S. PATENT DOCUMENTS

2011/0291861 A1\* 12/2011 Meunier ............. G08G 5/0008
340/945
2013/0346081 A1\* 12/2013 Loubiere ............. G08G 5/0013
704/260

\* cited by examiner

METHOD AND ELECTRONIC DEVICE OF CONTROL OF MESSAGES EXCHANGED BETWEEN AN AIRCRAFT AND A GROUND STATION, ASSOCIATED COMPUTER PROGRAM PRODUCT

CROSS-REFERENCE TO RELATED APPLICATIONS

This application claims the benefit under 35 U.S.C. §119 of French Application No. 15 00648, filed Mar. 31, 2015, which is herein incorporated by reference in its entirety.

BACKGROUND

Technological Field

The described technology generally relates to a method for managing messages exchanged between an aircraft piloted by at least one pilot, and a ground station.

The described technology also generally relates to an electronic device for managing exchanged messages.

Description of the Related Technology

"Ground station" refers to an air traffic control center above a predetermined geographical zone or any other station intended to control or at least observe the aircraft in such a zone.

"Aircraft" refers to a moving vehicle piloted by at least one pilot, and in particular able to fly in the Earth's atmosphere, such as an airplane, a drone or a helicopter.

"Pilot" refers to a person piloting the aircraft from a cockpit situated in the aircraft or at a distance therefrom.

In general, such an aircraft is able to fly in the Earth's atmosphere under the control of at least one ground station. This control is done as a function of the air traffic in the vicinity of the aircraft and in particular makes it possible to optimize this traffic and avoid collisions.

Different communication channels enabling communication between the pilot of the aircraft and the ground station exist in the related technology.

Among these channels, voice communication between the pilot and ground station through radio communication devices plays an important role. However, this communication channel is not always accessible throughout the entire flight of the aircraft and may sometimes lead to an erroneous interpretation of the information sent orally by one or the other party.

Thus, aside from voice communication, it is known to use a textual communication channel allowing the exchange of text messages between the pilot of the aircraft and the ground station. This communication channel is known in the state of the art under the term "Data Link" and corresponds to layer 2 of the open systems interconnection (OSI) model according to standard ISO 7498.

Generally, each message exchanged via the Data Link communication channel comprises operational data corresponding to a request or a response to a request intended for the pilot to pilot the aircraft.

Each exchanged message further comprises descriptive data in particular defining the type of the message. Thus, for example, it is conventional to distinguish messages of the Air Traffic Control (ATC) type, corresponding to messages related to air control, and messages of the Aeronautical Operational Control (AOC) type, corresponding to messages related to the operation of the aircraft.

All of the messages of a same type form one or more dialogues of the type. This dialogue thus comprises one or more requests and one or more responses to this or these request(s) exchanged between the ground station and the pilot of the aircraft.

A series of dialogues forms a dialogue sequence when the dialogues in that sequence are connected by a shared operational subject. "Operational subject" refers to a set of information relative to the state of the aircraft during an operating period and actions by the pilot exerted on the aircraft in that state and intended to achieve a same objective. Thus, the pieces of information relative to different flight phases of the aircraft, for example the takeoff phase or the landing phase, are considered operational subjects.

To carry out the Data Link communication, the aircraft generally includes a message acquisition capability of the "Data Link" type, a capability for displaying each text message as it is acquired, and a capability for storing acquired messages.

The storage capability, also referred to as "Logbook Data Link", allows the pilot to consult text messages previously acquired when the operational data contained in those messages is needed.

However, it is not possible for the pilot to have an overview of all of the text messages acquired and stored in the storage capability so as to find one or more necessary messages therein quickly. One can then see that this involves a higher cognitive load for the pilot of the aircraft, thus decreasing flight safety.

SUMMARY OF CERTAIN INVENTIVE ASPECTS

One inventive aspect is a method for managing messages exchanged between an aircraft piloted by at least one pilot and a ground station making it possible to obtain a quicker synthetic overview of all of the acquired text messages. This then makes it possible to find one or more relevant messages more quickly, decrease the cognitive load required from the pilot, and then improve flight safety.

To that end, another aspect relates to a method for managing messages exchanged between an aircraft piloted by at least one pilot and a ground station, each message including descriptive data and operational data, the descriptive data comprising a message type, a message identifier, and the transmission or reception date of that message by the aircraft, each message type being chosen from among an ATC type corresponding to messages related to air traffic control and an AOC type corresponding to messages related to the operation of the aircraft; all of the messages of a same type forming one or more dialogues of the type, each dialogue comprising messages including a same shared identifier and corresponding to a request and at least one response to that request.

The method can include the following steps:
acquiring a message;
extracting descriptive data from the acquired message and determining the identifier of the acquired message;
if the identifier of the acquired message corresponds to a shared identifier of the messages of a dialogue in progress, associating that acquired message with that dialogue;
if not, associating the acquired message with a new dialogue, the dialogue being of the type of the acquired message;
determining the position of a symbol corresponding to the dialogue associated with the acquired message, the position being determined based on the type and start date of this dialogue, the symbol being intended to be displayed in a display zone of the symbols corresponding to the different dialogues.

According to other advantageous aspects of the described technology, the management method comprises one or more of the following features, considered alone or according to all technically possible combinations:

displaying the symbol in the display zone according to the determined position;

the position of the symbol corresponding to the dialogue associated with the acquired message being further determined as a function of the duration of that dialogue;

the display zone includes a first axis representative of the timeline of the dialogues, and a second axis representative of the type of these dialogues; and the determination of the position of each symbol corresponding to a dialogue comprises determining a first coordinate on the first axis as a function of the start date and advantageously the duration of this dialogue, and the determination of a second coordinate on the second axis as a function of the type of this dialogue;

the operational data corresponds to a request or a response to a request regarding a predetermined operational subject; and all of the dialogues of a given type among the ATC type and the AOC type can form one or more sequences of the type, each sequence comprising a series of dialogues related to a same operational subject;

for each acquired message of a given type from among the ATC type and the AOC type, associating the acquired message with a sequence including at least one dialogue associated with the acquired message; otherwise, creating a new sequence associated with the acquired message and the type of the acquired message;

the symbol whose position is determined during the determination step is a symbol corresponding to the sequence;

creating contextual information for each new sequence, the contextual information including descriptive data of the corresponding acquired message and second descriptive data characterizing the aircraft;

modifying the contextual information of an existing sequence, the modification comprising modifying the value of an existing descriptive datum or a second existing descriptive datum, and/or adding a new descriptive datum or a new second descriptive datum;

filtering the symbols displayed in the display zone according to at least one filter comprising a symbol display criterion as a function of contextual information of the sequences corresponding to the symbols;

filtering symbols displayed in the display zone according to at least one filter comprising a symbol display criterion as a function of the type of the dialogues associated with these symbols;

the descriptive data of at least one message further include data chosen from among the group consisting of identifiers of the starting point and/or arrival point of the aircraft; identifier of the corresponding ground station; transmission date of the corresponding message by the corresponding ground station; estimated geographical position of the aircraft by the ground station; and additional data based on the message type; and each second descriptive datum is chosen from among the group consisting of the current geographical position of the aircraft, flight phase of the aircraft, starting point and/or arrival point of the aircraft identifiers, identification criterion of the ground station, contextual information of another existing sequence; and a state of the different components of the aircraft.

The described technology also relates to a computer program product including software instructions which, when implemented by computer equipment, carry out a method as defined above.

The described technology also relates to an electronic device for managing messages exchanged between an aircraft piloted by at least one pilot and a ground station, each message including descriptive data and operational data, the descriptive data comprising a message type, a message identifier and the transmission or reception date of that message by the aircraft, each message type being chosen from among an ATC type corresponding to messages related to aircraft control and an AOC type corresponding to messages related to the operation of the aircraft.

All of the messages of a same type forming one or more dialogues of the type, each dialogue comprising messages including a same shared identifier and corresponding to a request and at least one response to that request.

The device includes a processing module configured to acquire a message; extract descriptive data from the acquired message and determine the identifier of the acquired message; if the identifier of the acquired message corresponds to a shared identifier of the messages of the dialogue in progress, associate this acquired message with that dialogue; otherwise, associate the acquired message with a new dialogue, the new dialogue being of the type of the acquired message; determining the position of a symbol corresponding to the dialogue associated with the acquired message, the position being determined as a function of the type and start date of that dialogue, the symbol being intended to be displayed in a display zone of the symbols corresponding to the different dialogues.

BRIEF DESCRIPTION OF THE DRAWINGS

These features and advantages of the described technology will appear more clearly upon reading the following description, provided solely as a non-limiting example, and done in reference to the appended drawings, in which.

DETAILED DESCRIPTION OF CERTAIN INVENTIVE EMBODIMENTS

Figure 1:
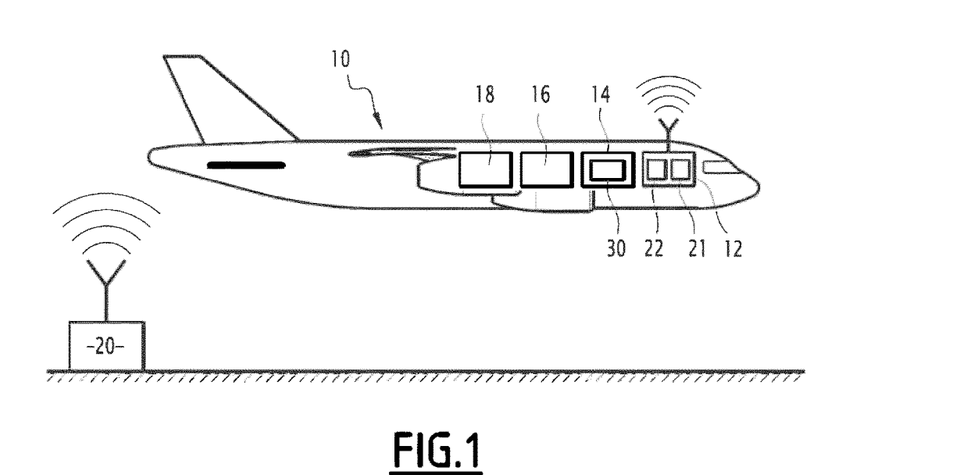
FIG. 1 is a diagrammatic view of an aircraft including an electronic device according to the described technology for managing exchanged messages and man-machine interface capability.

In the example embodiment of FIG. 1, the aircraft 10 is an airliner able to be piloted by at least one pilot. The piloting of the aircraft 10 includes different flight phases, for example, the takeoff, ascent, descent and landing phases.

According to other example embodiments, the aircraft 10 is an aircraft of another type, for example, a corporate airplane or a military airplane, or a helicopter.

According to still another example embodiment, the aircraft 10 is a drone piloted from a remote piloting unit.

The aircraft 10 includes a capability 12 for communicating with the ground in particular making it possible to exchange Data Link text messages with the ground, corresponding to layer 2 of the OSI model according to standard ISO 7498, an electronic device 14 for managing the messages, a capability forming a man-machine interface 16 and a capability 18 for storing the messages.

The ground communication capability 12 more particularly makes it possible to communicate with at least one ground station 20, for example, comprising an air traffic control center below a geographical zone flown over by the aircraft 10. Alternatively, the ground station 20 is an observation center of the aircraft 10 by the corresponding airline.

The communication capability 12 includes a first communication unit 21 for voice communication with the ground and a second communication unit 22 for to communication via Data Link text messages.

The electronic device 14 for managing messages is connected to the second communication unit 22 and is able to process Data Link text messages received by the second communication unit 22 or Data Link text messages intended to be sent to the ground station 20 via the second communication unit 22.

To that end, the electronic device 14 includes a message processing module or message processor 30 carrying out a method for managing messages exchanged between the aircraft 10 and the ground station 20 according to the described technology. This management method will be described in more detail later.

The electronic device 14 is, for example, an onboard computer for example including a memory and a processor (not illustrated). The processing module 30 is, for example, formed by software able to be stored in the memory and executed by the processor. Alternatively, the processing module 30 is formed by a programmable logic component, such as an Field-Programmable Gate Array (FPGA), or a dedicated integrated circuit of the Application-Specific Integrated Circuit (ASIC) type.

The man-machine interface capability 16 is connected to the electronic device 14. In reference to FIG. 2, the man-machine interface capability 16 includes a display screen 36, a data entry unit 38 and a pointing device 39, for example, a mouse.

The storage capability 18 is connected to the electronic device 14 and, for example, comprises a hard disk able to store text messages sent or received via the electronic device 14.

The storage capability 18 thus forms a "Logbook Data Link" for the messages exchanged between the aircraft 10 and the ground station 20.

The first communication unit 21, known in itself, allows the pilot to communicate vocally, i.e., orally, with the ground station 20. More particularly, the first communication unit 21 comprises a voice radiocommunication unit via radiofrequency waves, for example, waves of the High Frequency (HF) type or Very High Frequency (VHF) type.

To that end, the first communication unit 21 defines a coverage range within which it is able to send and receive radio waves for the corresponding frequencies. Thus, voice communication between the pilot and the ground station 20 is possible when the ground station 20 is in the coverage range of the first communication unit 21.

The second communication unit 22 allows the pilot to communicate with the ground station 20 by exchanging Data Link text messages. The text messages are sent in the form of radio waves by using different transmission technologies known in themselves.

Thus, for example, when the distance between the aircraft 10 and the ground station 20 is less than several hundreds of kilometers, for example, less than 400 km, and desirably less than 370 km, the transmission of the radio waves is done directly by using very high frequencies of the VHF type.

When the distance between the aircraft 10 and the ground station 20 does not allow a direct transmission, the transmission of the radio waves is done through other ground stations and/or satellites.

Figure 2:
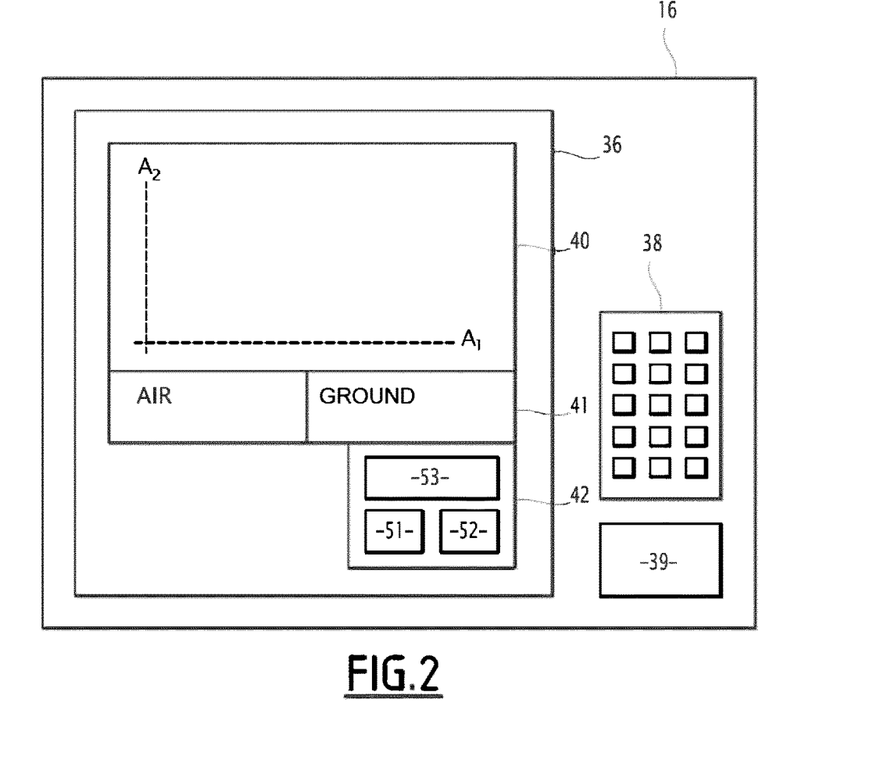
FIG. 2 is a diagrammatic view of the man-machine interface capability of FIG. 1, the man-machine interface capability in particular including a display screen.

The display screen 36 is dedicated to displaying information relative to the communication with the ground, and in particular with the ground station 20.

More particularly, the display screen 36 includes a display zone 40, a preview zone 41 and a display control zone 42, as shown in FIG. 2.

According to one example embodiment, the display screen 36 is a touchscreen.

The data entry unit 38 allows the pilot to enter a Data Link text message to send it to the ground station 20 through the electronic device 14 and the second communication unit 22.

The data entry unit 38, for example, comprises a keyboard.

The display zone 40 is able to display symbols corresponding to dialogues $D_i$ associated with Data Link text messages exchanged with the ground unit 20. When a dialogue $D_i$ is associated with a sequence $S_i$, the display zone 40 is further able to display a symbol corresponding to that sequence $S_i$.

The display zone 40 includes a first axis $A_1$, advantageously horizontal, and a second axis $A_2$, advantageously vertical.

The first axis $A_1$ is representative of the timeline of the dialogues $D_i$ or sequences $S_i$, and makes it possible to display the symbols corresponding to these dialogues $D_i$ or these sequences $S_i$ in a stepped manner.

The second axis $A_2$ is representative of the type of dialogues $D_i$ or sequences $S_i$, and makes it possible to display the symbols corresponding to these dialogues $D_i$ or these sequences $S_i$ as a function of their type.

The position of each symbol in the display zone 40 is determined using the management method, as will be explained below.

The preview zone 41 is able to display at least part of the messages associated with a dialogue $D_i$ or a sequence $S_i$ when the pilot selects the symbol corresponding to that dialogue $D_i$ or that sequence $S_i$, for example using the pointing device 39.

The preview zone 41 includes a first part designated in FIG. 2 as "AIR" and a second part designated in FIG. 2 as "GROUND". The messages sent by the pilot of the aircraft 10 are then previewed in the first part, and the messages sent by the ground station 20 are previewed in the second part.

The display control zone 42 makes it possible to control the display in the display zone 40 via a plurality of tactile buttons 51 to 53, as will be explained later.

In general, communication via Data Link text messages is mentioned in the various standards in the aeronautics field, for example standards European Organization for Civil Aviation Equipment (EUROCAE)-ED-100A, EUROCAE-ED-110B and EUROCAE-ED-228.

Each Data Link text message relates to the piloting of the aircraft 10 and, for example, makes it possible to pilot the aircraft in agreement with the ground station 20.

Each Data Link text message includes descriptive information $DD_1$ and operational information DO.

The descriptive data $DD_1$ are metadata making it possible to characterize the corresponding text message. The descriptive data $DD_1$ in particular comprise the following data fields, also called data categories:
- message type;
- message identifier;
- transmission or reception date of this message by the aircraft 10;
- starting and/or arrival point identifiers of the aircraft 10;
- ground station 20 identifier; and
- when the message is sent by the station 20, the date of its transmission and estimated geographical position of the aircraft 10 by the ground station 20.

According to one example embodiment, the descriptive data $DD_1$ comprise at least one additional data field in particular comprising data based on the type of message.

The "date" of an event refers to a moment in time for example comprising the time of that event.

Of course, other examples of descriptive data categories are also possible.

According to one example embodiment, the aforementioned categories vary from one message to the next.

The message type makes it possible to distinguish messages based on their application to the piloting of the aircraft 10. Each message type is chosen from the group consisting of:
- an ATC type corresponding to messages related to air traffic control; and
- an AOC type corresponding to messages related to the operation of the aircraft 10, in particular different components of the aircraft 10.

The operational data DO are application data directly usable to pilot the aircraft 10. The operational data DO generally correspond to a request or a response to a request exchanged between the pilot of the aircraft 10 and the ground station 20.

For example, such a request comprises a request to change the cruising altitude of the aircraft 10 sent by the pilot to the air traffic control center. A response to such a request then comprises an authorization or a prohibition regarding the change, from the air traffic control center.

Each message relates to a specific operational subject. Thus, in the previous example, the messages corresponding to the request from the pilot and the response to that request from the air traffic control center relate to the flight of the aircraft 10 during the cruising phase.

At least some of the messages correspond to error messages making it possible to indicate an error related to at least one other exchanged message or reminder messages making it possible to refer to at least one other exchanged message.

All of the messages of a same type form one or more dialogues $D_i$ of the type. Each dialogue $D_i$ comprises messages including a same shared identifier, such as a same Message Reference Number (MRN) for the ATC type, and corresponding to a request and at least one response to that request.

Thus, in the previous example, a dialogue $D_i$ is formed by a message corresponding to the request from the pilot to change the altitude, and a message corresponding to the response from the air traffic control center to that request. It should be noted that in this case, both messages have a same shared identifier and are of the ATC type. The corresponding dialogue $D_i$ is therefore also of the ATC type.

Lastly, all of the dialogues of the ATC type form one or more sequences $S_i$ of the type. Each sequence $S_i$ comprises a series of dialogues $D_i$ related to a same operational subject.

In the example mentioned above, a sequence $S_i$ is formed by several dialogues $D_i$, for example, related to the cruising altitude, or more generally, the cruising phase.

Additionally or alternatively, all of the dialogues of the AOC type form one or more sequences $S_i$ of the AOC type depending on the criterion previously described.

To determine whether a message or a dialogue $D_i$ belongs to a sequence $S_i$, the storage capability 18 is able to store a list of sequences including all of the messages expected for each sequence $S_i$ in progress. The list of sequences then contains all of the messages able to be associated with at least one dialogue $D_i$ of the sequence $S_i$ at the given moment.

A message is associated with a sequence $S_i$ when that message is associated with a single and same dialogue $D_i$ of that sequence $S_i$.

Table 1 below illustrates an example of a list of sequences including two sequences: SEQ_DCL1 and SEQ_DCL2. These sequences correspond to the operational subject associated with the sending of a departure clearance, also called DCL (Departure Clearance) theme, to allow the pilot to know the path to be followed in the airport zone to reach the takeoff runway.

TABLE 1

| List of possible sequences for DCL | List of dialogues | List of possible dialogues | MRN |
|---|---|---|---|
| SEQ_DCL1 | D1 | D1 = DM139 &UM1<br>or D1 = DM139 &UM0 | MIN value of message DM139 |
|  | D2 | D2 = (UM73R &UM267) & (DM2 &DM0)<br>or D2 = (UM73R &UM267) & (DM2 &DM1)<br>or D2 = UM73R &UM267) & DM0<br>or D2 = UM73R &UM267) & DM1 | MIN value of the concatenation of messages UM73R and UM267 |
|  | D3 | D3 = (UM325 & UM267) & ((DM2 & DM0)<br>or D3 = (UM325 & UM267) &(DM2 & DM1)<br>or D3 = (UM325 & UM267) &DM0<br>or D3 = (UM325 & UM267) &DM1 | MIN value of the concatenation of messages UM325 and UM267 |
| SEQ_DCL2 | D2 | D2 = (UM73R &UM267) & (DM2 &DM0)<br>or D2 = (UM73R &UM267) & | MIN value of the concatenation of messages UM73R |

TABLE 1-continued

| List of possible sequences for DCL | List of dialogues | List of possible dialogues | MRN |
|---|---|---|---|
| | | (DM2 &DM1)<br>or D2 = UM73R &UM267) & DM0<br>or D2 = UM73R &UM267) & DM1 | and UM267 |
| | D3 | D3 = (UM325 & UM267) & ((DM2 & DM0)<br>or D3 = (UM325 & UM267) &(DM2 & DM1)<br>or D3 = (UM325 & UM267) &DM0<br>or D3 = (UM325 & UM267) &DM1 | MIN value of the concatenation of messages UM325 and UM267 |

According to table 1, sequence SEQ_DCL1 contains dialogues D1, D2 and D3 and sequence SEQ_DCL2 contains dialogues D2 and D3. For each of these dialogues, the "List of possible dialogues" column specifies the possible associations of the messages. Thus, for example, the messages of type DM139, UM0 and UM1 can be associated with dialogues D1 and sequence SEQ_DCL1 uniquely.

Each message in table 1 has an identifier beginning with UM for the uplink messages received by the aircraft 10 from the ground station 20, or with DM for the downlink messages sent by the aircraft 10 to the ground station 20, then followed by one or more numbers, or optionally one or more letters following the number(s). The "MRN" column defines the identifier for each of the dialogues as a function of the identifiers of the messages contained in those dialogues.

Figure 3:
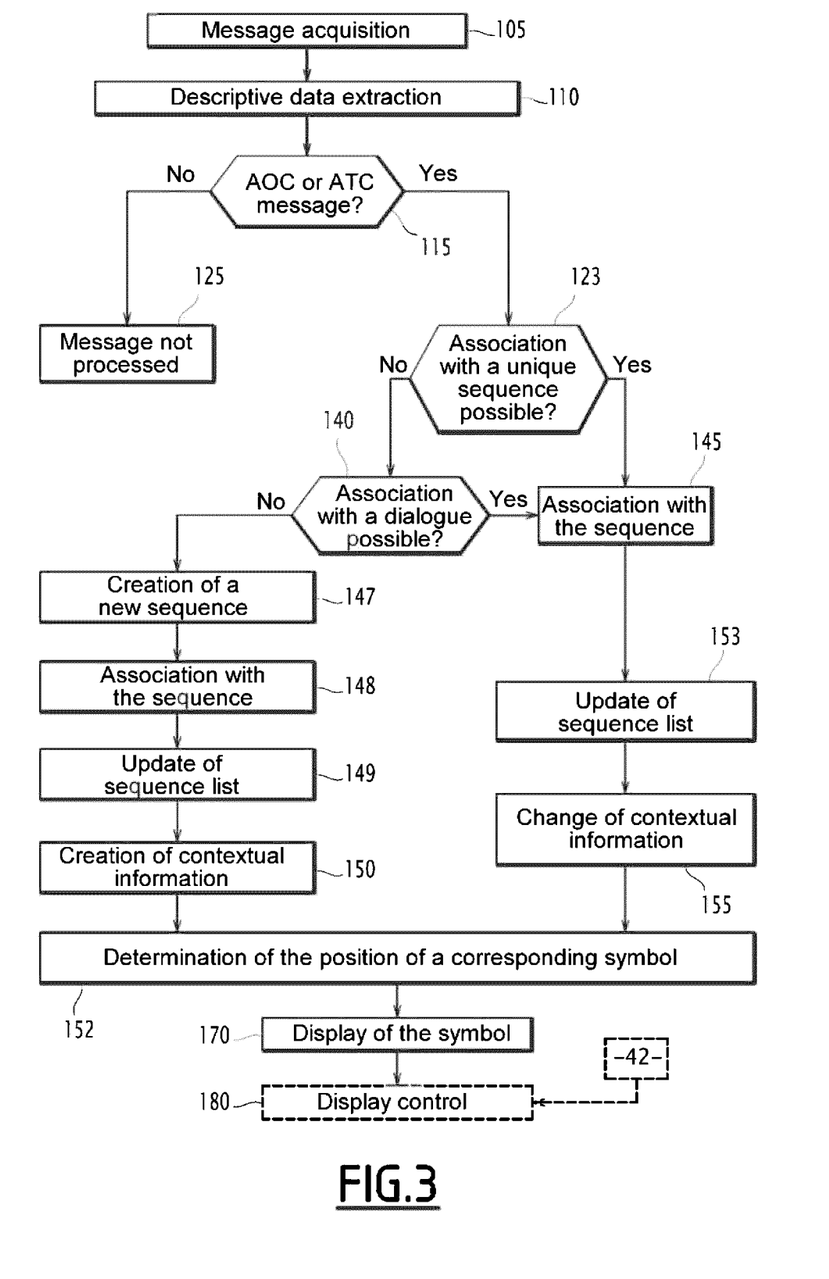
FIG. 3 is a flowchart of a method for managing exchanged messages, implemented by the electronic device of FIG. 1.

The method for managing messages exchanged between the aircraft 10 and the ground station 20 will now be described in reference to FIG. 3, illustrating a flowchart of the method.

This management method is not limited by the processing module 30 of the electronic device 14 upon each acquisition of a Data Link text message by the electronic device 14.

"Acquisition" of a text message refers to the transmission of the text message entered via the data entry unit 38, from the electronic device 14 toward the second communication unit 22 to send it to the ground station 20, or the reception of a text message sent by the ground station 20, by the electronic device 14 through the second communication unit 22.

During the initial step 105, the processing module 30 acquires a Data Link text message and stores it in the storage capability 18.

During the following step 110, the processing module 30 extracts the descriptive data $DD_1$ contained in the acquired message. The processing module 30 in particular extracts the message identifier and the message type.

During the following step 115, the processing module 30 determines the type of the acquired message. When the acquired message is of a given type from among the ATC and AOC types, the processing module 30 goes to step 123, otherwise the message is considered invalid during step 125 and is no longer processed by the processing module 30.

During step 123, the processing module 30 determines whether an association of the acquired message with an existing sequence $S_{ex}$ is uniquely possible. In particular, during step 123, the processing module 30 determines whether the acquired message is contained in the list of sequences for each existing sequence $S_{ex}$, and whether this acquired message appears a single time in the list.

When such a sequence $S_{ex}$ does not exist or the possible association is not unique, the processing module 30 goes on to step 140. Otherwise, the processing module 30 goes on to step 145, during which the processing module 30 associates the acquired message with the corresponding single existing sequence $S_{ex}$.

During step 140, the processing module 30 determines whether an association of the acquired message with an existing dialogue $D_{ex}$ is possible. More particularly, the processing module 30 determines whether the identifier of the extracted message corresponds to the identifier of another message previously acquired and stored in the storage capability 18. When the identifier of the extracted message corresponds to the identifier of another message previously acquired, the processing module goes to step 145. When no message corresponding to this identifier has been previously acquired, which means that an association with an existing dialogue $D_{ex}$ is not possible, the processing module 30 goes to step 147.

During step 147, the processing module 30 creates a new sequence $S_i$ of the same type as the acquired message.

The new sequence $S_i$ relates to the operational subject of the acquired message and in particular contains a new dialogue $D_i$ including the same identifier, desirably the same MRN, as the acquired message.

Then, the processing module goes to step 148, during which the processing module 30 associates the acquired message with the new sequence $S_i$.

During the following step 149, the processing module 30 adds, in the list of sequences, all of the expected messages for the sequence $S_i$ and updates that list.

During the following step 150, the processing module 30 creates contextual information IC of the sequence $S_i$. The contextual information IC in particular makes it possible to characterize the context in which the sequence $S_i$ was created. "Context" refers to a set of information related to the state of the aircraft 10, its components and surroundings at the acquisition moment of the message, as well as the data sent by the acquired message.

More particularly, the contextual information IC includes the descriptive data $DD_1$ of the acquired message and second descriptive data $DD_2$ characterizing the current state of the aircraft 10. The second descriptive data $DD_2$ are chosen from the group consisting of:

a current geographical position of the aircraft 10, for example, comprising an identifier of a closest waypoint;

a flight phase of the aircraft 10;

starting and/or arrival point identifiers of the aircraft 10;

an identification criterion of the ground station 20;

contextual information IC of another existing sequence $S_{ex}$; and a state of the various components of the aircraft 10.

At the end of step 150, the processing module 30 goes to step 152, during which the processing module 30 determines the position of a symbol corresponding to the sequence $S_i$ associated with the acquired message, in the display zone 40 of the display screen 36.

More particularly, the determination of the position of the symbol comprises the determination of a first coordinate on the first axis $A_1$ as a function of the start time, and more particularly as a function of the acquisition time of the message, and the determination of a second coordinate on the second axis $A_2$ to as a function of the type of the sequence $S_i$.

The second coordinate is determined as a function of the type of sequence $S_i$ associated with the acquired message.

If step 145 follows step 140, then during step 145, the processing module 30 associates the message with the sequence $S_{ex}$ with which the dialogue $D_{ex}$ is associated.

During step 153 following step 145, the processing module updates the list of sequences by updating the set of expected messages at that moment for the sequence $S_{ex}$ and goes to step 155.

During step 155, the processing module 30 modifies the contextual information IC of the sequence $S_{ex}$ as a function of descriptive data $DD_1$ of the acquired message, and optionally, as a function of the second descriptive data $DD_2$ updated upon acquisition of the message.

In particular, this step 155 comprises modifying the value of a descriptive datum $DD_1$ or a second descriptive datum $DD_2$ associated with the contextual information IC of the existing sequence $S_{ex}$.

This step 155 further comprises adding a new descriptive datum $DD_1$ or second new descriptive datum $DD_2$ associated with the contextual information IC of the existing sequence $S_{ex}$.

At the end of step 155, the processing module 30 goes to step 152, during which the processing module 30 determines the position of a symbol corresponding to the existing sequence $S_{ex}$ associated with the acquired message, in the display zone 40 of the display screen 36.

More particularly, the determination of the position of the symbol comprises determining a first coordinate on the first axis $A_1$ as a function of the start time and duration of the sequence $S_{ex}$, and the determination of a second coordinate on the second axis $A_2$ as a function of the type of the sequence $S_{ex}$.

Then, the processing module 30 determines a new duration of the sequence $S_{ex}$ as a function of the acquisition time of the message.

The second coordinate is determined as a function of the type of the sequence $S_{ex}$ associated with the acquired message.

After having determined the first and second coordinates of a symbol corresponding to the dialogue $D_i$ or $D_{ex}$ or the sequence $S_i$ or $S_{ex}$ associated with the message acquired during step 152, the processing module 30 goes to step 170, during which the processing module 30 displays the symbol in the display zone 40 according to the first coordinate and the second coordinate that have been determined.

Figure 4:
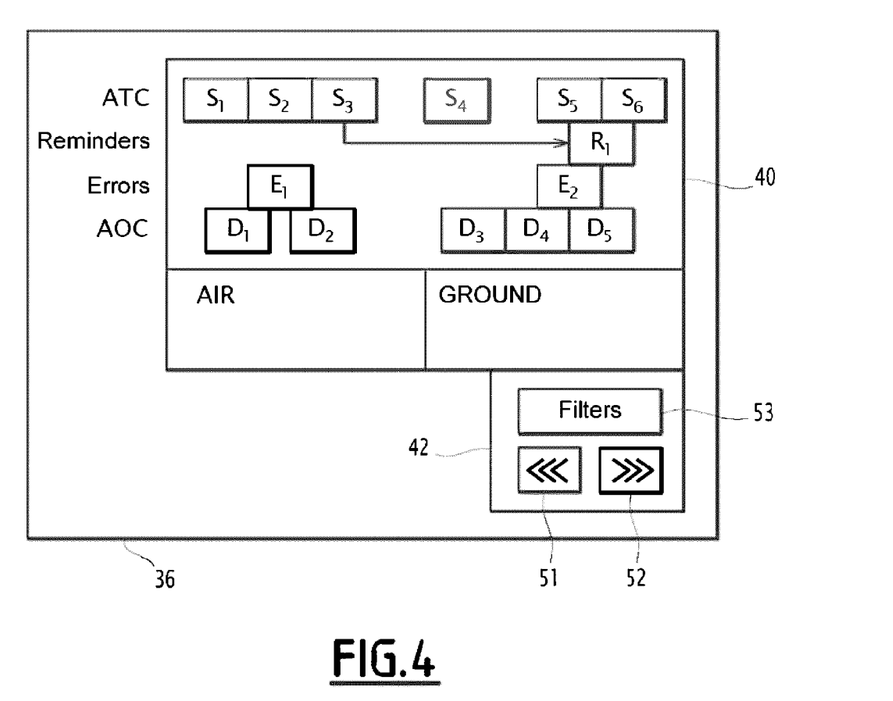
FIG. 4 is a view of information displayed on the display screen of FIG. 2.

One example of such a display is illustrated in FIG. 4.

In this figure, fourteen symbols $S_1$ to $S_6$, $R_1$, $E_1$ and $E_2$ and $D_1$ to $D_5$ are displayed in a stepped manner along with the first axis $A_1$, which corresponds to the total flight time of the aircraft 10, or alternatively to part of that flight.

Symbols $S_1$ to $S_6$ correspond to sequences $S_i$ of the ATC type. Symbol $R_1$ corresponds to a sequence of the ATC type containing a reminder message for the sequence corresponding to symbol $S_3$. In this case, the processing module 30 also displays an arrow from symbol $S_3$ toward symbol $R_1$.

Symbols $E_1$ and $E_2$ correspond to sequences associated with one or more error messages. Symbols $D_1$ to $D_5$ correspond to sequences of the AOC type.

Optionally, during the following step 180, the processing module 30 modifies, as needed, the display zone 40 as a function of display instructions given by the pilot via the display control zone 42.

Thus, for example, when the pilot actuates the button 51 in the display control zone 42, the processing module 30 displays symbols that were no longer visible in the time window defined by the first axis $A_1$.

When the pilot actuates the button 52, the processing module 30 again displays symbols corresponding to the last acquired messages.

When the pilot actuates the button 53, the processing module 30 proposes to the pilot to choose one or more filters from a list of filters to modify the display.

The list of filters in particular includes a filter comprising display criteria for symbols as a function of the type of dialogues $D_i$ or sequences $S_i$ associated with the symbols. When the pilot selects one or more types, the processing module 30 only displays symbols corresponding to the dialogues $D_i$ and/or the sequences $S_i$ of that or those types.

The list of filters further includes a filter comprising display criteria as a function of a state of the sequences. Each state of the sequences, for example, comprises a "sequence obsolete" state, a "sequence rejected by aircraft 10" state, or a "sequence rejected by ground station 20" state. An "obsolete sequence" refers to a sequence whose reception date is earlier than the current date by a predetermined time threshold. The predetermined threshold is, for example, equal to 12 hours.

The list of filters further includes a filter comprising display criteria as a function of the identifier of the messages contained in the sequence.

The list of filters further includes a filter comprising display criteria for symbols as a function of contextual information IC of the sequences $S_i$ corresponding to the symbols. In this case, the processing module 30 only displays symbols corresponding to the sequences $S_i$ whereof the contextual information meets criteria determined by the pilot. It is thus possible to obtain the display of symbols corresponding to the sequences $S_i$ acquired during a determined flight phase, a determined time interval or a determined date, in the vicinity of a geographical position of the aircraft 10 determined, for example, at 5 Nm from the position, etc. In general, it is possible to associate each piece of contextual information IC with a display criterion.

Lastly, when the pilot selects a symbol using the pointing device 39, the processing module 30 displays, in the preview zone 41, a preview of messages associated with the dialogue $D_i$ or with the sequence $S_i$ corresponding to the selected symbol.

According to one alternative embodiment, at least some of the dialogues $D_i$ of a given type, for example, of the AOC type, are not associated with sequences $S_i$. In this case, during step 152, the processing module 30 determines the position of a symbol corresponding to a dialogue $D_i$ of the given type in the display zone 40 of the display screen 36 as a function of the start time and/or the duration of this dialogue $D_i$ and as a function of the type of this dialogue $D_i$.

During step 170, the processing module 30 then displays the symbol corresponding to this dialogue $D_i$.

Thus, the display of symbols corresponding to the dialogues $D_i$ and to the sequences $S_i$ in a stepped manner as a function of the type allows the pilot to have an overview of all of the acquired messages, and to then find a relevant message more quickly.

The described technology further allows the pilot to refine the search by using filters. These filters in particular make it possible to sort the symbols corresponding to the sequences $S_i$ as a function of many criteria corresponding to the contextual information IC associated with the sequences $S_i$.

One can see that the management method and device 14 according to the described technology makes it possible to decrease the cognitive load required from the pilot, and to improve the flight safety of the aircraft 10.

As can be appreciated by one of ordinary skill in the art, each of the modules or software of the program(s) can include various sub-routines, procedures, definitional statements, and macros. Each of the modules are typically separately compiled and linked into a single executable program. Therefore, any description of modules or software is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A method of managing messages exchanged between an aircraft piloted by at least one pilot and a ground station, each message including descriptive data and operational data, the descriptive data comprising a message type, a message identifier and the transmission or reception date of that message by the aircraft, each message type being chosen from among an Air Traffic Control (ATC) type corresponding to messages related to aircraft control and an Aeronautical Operation Control (AOC) type corresponding to messages related to the operation of the aircraft,
all of the messages of a same type forming one or more dialogues of the type, each dialogue comprising messages including a same shared identifier and corresponding to a request and at least one response to that request,
the method comprising:
acquiring a message;
extracting descriptive data from the acquired message;
determining the identifier of the acquired message;
if the identifier of the acquired message corresponds to a shared identifier of the messages of a dialogue in progress, associating that acquired message with that dialogue;
if not, associating the acquired message with a new dialogue, the dialogue being of the type of the acquired message; and
determining the position of a symbol corresponding to the dialogue associated with the acquired message, the position being determined based on the type and start date of this dialogue, the symbol being configured to be displayed in a display zone of the symbols corresponding to the different dialogues,
wherein the operational data corresponds to a request or a response to a request regarding a predetermined operational subject, and
wherein all of the dialogues of a given type among the ATC type and the AOC type are configured to form one or more sequences of the type, each sequence comprising a series of dialogues related to a same operational subject.

2. The method according to claim 1, further comprising displaying the symbol in the display zone according to the determined position.

3. The method according to claim 1, wherein the position of the symbol corresponding to the dialogue associated with the acquired message is further determined as a function of the duration of that dialogue.

4. The method according to claim 1, wherein:
the display zone includes a first axis representative of the timeline of the dialogues, and a second axis representative of the type of these dialogues; and
the determination of the position of each symbol corresponding to a dialogue comprises determining a first coordinate on the first axis as a function of the start date, and determining a second coordinate on the second axis as a function of the type of this dialogue.

5. The method according to claim 1, further including, for each acquired message of a given type from among the ATC type and the AOC type:
associating the acquired message with a sequence including at least one dialogue associated with the acquired message; and
otherwise, creating a new sequence associated with the acquired message and the type of the acquired message.

6. The method according to claim 5, wherein the symbol whose position is determined during the determination step is a symbol corresponding to the sequence.

7. The method according to claim 1, further comprising creating contextual information for each new sequence, the contextual information including descriptive data of the corresponding acquired message and second descriptive data characterizing the aircraft.

8. The method according to claim 7, further comprising modifying the contextual information of an existing sequence, the modifying of the contextual information of an existing sequence comprising modifying the value of an existing descriptive datum or a second existing descriptive datum, and/or adding a new descriptive datum or a new second descriptive datum.

9. The method according to claim 7, further comprising filtering the symbols displayed in the display zone according to at least one filter comprising a symbol display criterion as a function of contextual information of the sequences corresponding to these symbols.

10. The method according to claim 1, further comprising filtering symbols displayed in the display zone according to at least one filter comprising a symbol display criterion as a function of the type of the dialogues associated with these symbols.

11. The method according to claim 1, wherein the descriptive data of at least one message further include data selected from at least one of:
starting and/or arrival point identifiers of the aircraft;
a corresponding ground station identifier;
a transmission date of the corresponding message by the corresponding ground station;
an estimated geographical position of the aircraft by the ground station; and
additional data based on the message type.

12. The method according to claim 7, wherein each second descriptive datum is selected from at least one of:
a current geographical position of the aircraft;
a flight phase of the aircraft;
starting and/or arrival point identifiers of the aircraft;
an identification criterion of the ground station;
contextual information of another existing sequence; and
a state of the various components of the aircraft.

13. The method according to claim 4, wherein the first coordinate on the first axis is further determined as a function of the duration of the corresponding dialogue.

14. A non-transitory computer-readable medium for managing messages exchanged between an aircraft piloted by at least one pilot and a ground station, each message including descriptive data and operational data, the descriptive data comprising a message type, a message identifier and the transmission or reception date of that message by the aircraft, each message type being chosen from among an Air Traffic Control (ATC) type corresponding to messages related to aircraft control and an Aeronautical Operation Control (AOC) type corresponding to messages related to the operation of the aircraft,
all of the messages of a same type forming one or more dialogues of the type, each dialogue comprising messages including a same shared identifier and corresponding to a request and at least one response to that request,
the non-transitory computer-readable medium comprising software instructions which, when executed by a computer, cause the computer to:
acquire a message;
extract descriptive data from the acquired message;
determine the identifier of the acquired message;
if the identifier of the acquired message corresponds to a shared identifier of the messages of a dialogue in progress, associate that acquired message with that dialogue;
if not, associate the acquired message with a new dialogue, the dialogue being of the type of the acquired message; and
determine the position of a symbol corresponding to the dialogue associated with the acquired message, the position being determined based on the type and start date of this dialogue, the symbol being configured to be displayed in a display zone of the symbols corresponding to the different dialogues,
wherein the operational data corresponds to a request or a response to a request regarding a predetermined operational subject, and
wherein all of the dialogues of a given type among the ATC type and the AOC type are configured to form one or more sequences of the type, each sequence comprising a series of dialogues related to a same operational subject.

15. An electronic device for managing messages exchanged between an aircraft piloted by at least one pilot and a ground station, each message including descriptive data and operational data, the descriptive data comprising a message type, a message identifier and the transmission or reception date of that message by the aircraft, each message type being chosen from among an Air Traffic Control (ATC) type corresponding to messages related to aircraft control and an Aeronautical Operation Control (AOC) type corresponding to messages related to the operation of the aircraft,
all of the messages of a same type forming one or more dialogues of the type, each dialogue comprising messages including a same shared identifier and corresponding to a request and at least one response to that request,
the device including a processor circuit configured to:
acquire a message;
extract descriptive data from the acquired message and determine the identifier of the acquired message;
if the identifier of the acquired message corresponds to a shared identifier of the messages of a dialogue in progress, associate that acquired message with that dialogue;
if not, associate the acquired message with a new dialogue, the dialogue being of the type of the acquired message; and
determine the position of symbol corresponding to the dialogue associated with the acquired message, the position being determined based on the type and start date of this dialogue, the symbol being intended to be displayed in a display zone of the symbols corresponding to the different dialogues,
wherein the operational data corresponds to a request or a response to a request regarding a predetermined operational subject, and
wherein all of the dialogues of a given type among the ATC type and the AOC type are configured to form one or more sequences of the type, each sequence comprising a series of dialogues related to a same operational subject.

* * * * *